United States Patent
Yamamoto

(10) Patent No.: US 11,526,900 B2
(45) Date of Patent: Dec. 13, 2022

(54) AGGREGATION SYSTEM AND CONTROL METHOD OF THE SAME

(71) Applicant: CANON KABUSHIKI KAISHA, Tokyo (JP)

(72) Inventor: Tatsuya Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 184 days.

(21) Appl. No.: 17/027,939

(22) Filed: Sep. 22, 2020

(65) Prior Publication Data

US 2021/0103942 A1 Apr. 8, 2021

(30) Foreign Application Priority Data

Oct. 8, 2019 (JP) .............................. JP2019-185459

(51) Int. Cl.
*G06F 11/30* (2006.01)
*G06Q 30/02* (2012.01)
*G06Q 50/02* (2012.01)

(52) U.S. Cl.
CPC ......... *G06Q 30/0203* (2013.01); *G06Q 50/02* (2013.01)

(58) Field of Classification Search
CPC .......................... G06Q 50/02; G06Q 30/0203
See application file for complete search history.

(56) References Cited

U.S. PATENT DOCUMENTS

2015/0242799 A1* 8/2015 Seki ..................... A01B 79/005
705/7.15
2017/0287082 A1* 10/2017 Karube ................. G06Q 50/02

FOREIGN PATENT DOCUMENTS

JP 2006-042721 A 2/2006

* cited by examiner

*Primary Examiner* — Phuong Huynh
(74) *Attorney, Agent, or Firm* — Carter, DeLuca & Farrell LLP

(57) ABSTRACT

An aggregation system comprises a server holding the survey results of crops and a management apparatus, wherein the management apparatus acquires, from the server, survey data indicating results of a survey of crops performed in the farm field in a set period, and containing information of at least a date of the survey and survey contents, edits the information of the acquired survey data, and transmits the edited survey data to the server, and wherein the server manages survey data, transmits survey data to the management apparatus, updates, when edited survey data is received from the management apparatus, managed survey data by the edited survey data, and aggregates survey data containing the updated survey data, and indicating results of a survey of crops performed in the farm field in the set period.

23 Claims, 10 Drawing Sheets

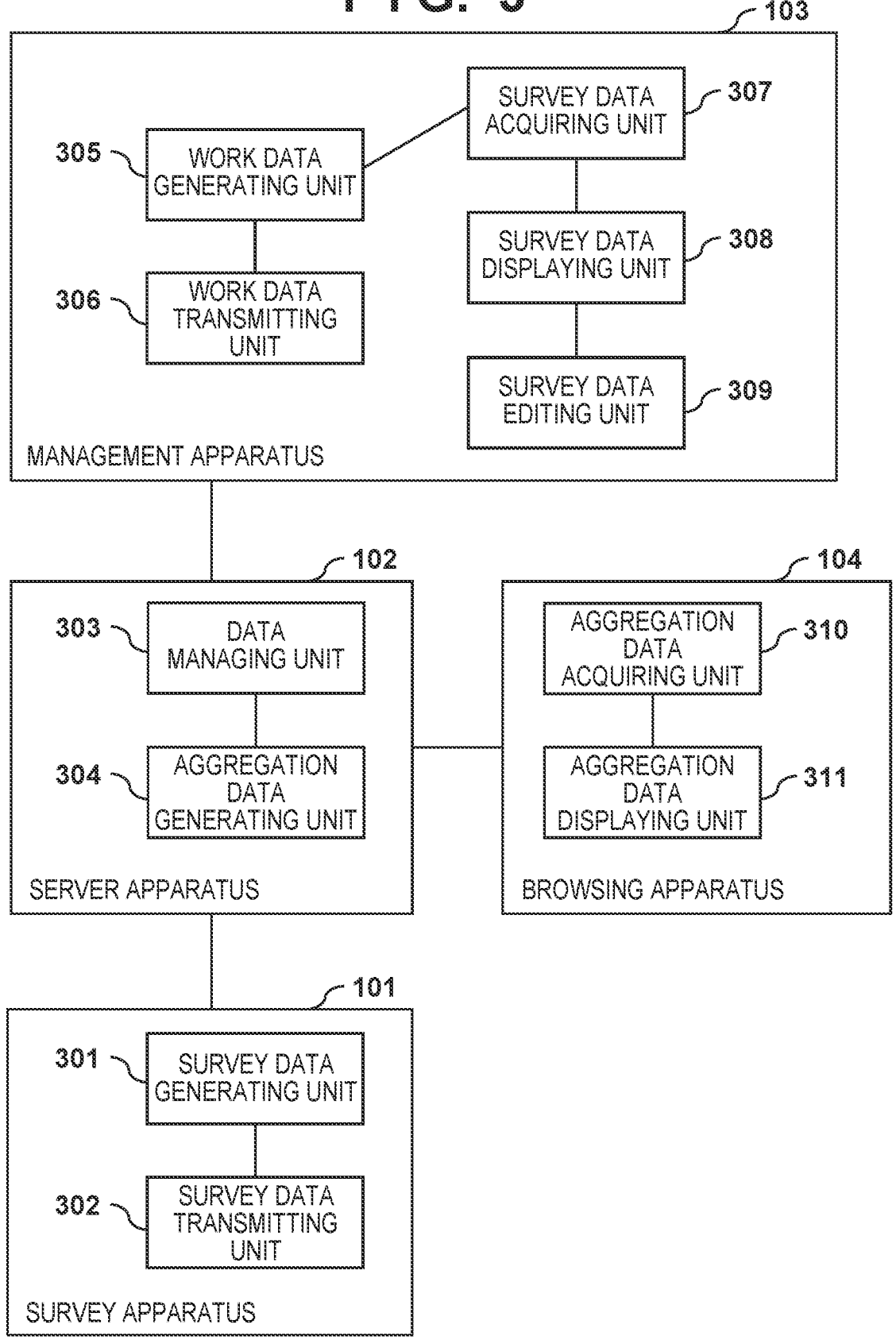

FIG. 4A

| WORK TYPE ID | WORK TYPE NAME |
|---|---|
| 1 | Pest and Disease Survey |
| 2 | Yield Estimation Survey |
| 3 | Maturity Survey |

FIG. 4B

| TAG ID | WORK TYPE ID | TAG |
|---|---|---|
| 1 | 1 | Downy mildew |
| 2 | 1 | Powdery mildew |
| 3 | 1 | Botrytis |
| 4 | 1 | Eutypa |
| 5 | 1 | Bud mite |
| 6 | 1 | Rust mite |
| 7 | 2 | Inflorescence count |
| 8 | 2 | Fruit set count |
| 9 | 2 | Bunch count |
| 10 | 3 | Brix |
| 11 | 3 | pH |
| 12 | 3 | Titratable acidity |
| 13 | 3 | Anthocyanins |

FIG. 5

| BLOCK ID | BLOCK NAME | AREA |
|---|---|---|
| 1 | 1a | (x10,y10)-(x11,y11)-... |
| 2 | 1b | (x20,y20)-(x21,y21)-... |
| 3 | 1c | (x30,y30)-(x31,y31)-... |
| 4 | 2a | (x40,y40)-(x41,y41)-... |
| 5 | 2b | (x50,y50)-(x51,y51)-... |

| SERVEY ID | SURVEY DAY | POSITION | BLOCK ID | TAG ID | TAG VALUE | IMAGE ID |
|---|---|---|---|---|---|---|
| 1 | 2019/5/29 | (x1, y1) | 1 | 2 | 20 | IMG_1 |
| 2 | 2019/5/29 | (x2, y2) | 1 | 9 | 25 | IMG_2 |
| 3 | 2019/5/29 | (x3, y3) | 1 | 4 | 10 | IMG_3 |
| 4 | 2019/5/29 | (x4, y4) | 1 | 2 | 20 | IMG_4 |
| 5 | 2019/5/29 | (x5, y5) | 1 | 9 | 30 | IMG_5 |
| 6 | 2019/5/29 | (x6, y6) | 1 | 9 | 25 | IMG_6 |

| WORK ID | WORK NAME | WORK TYPE ID | TAG ID | BLOCK ID | PERIOD |
|---|---|---|---|---|---|
| 1 | Survey 1 | 2 | 9 | 1,2,3 | 2019/5/28-2019/5/30 |
| 2 | Survey 2 | 3 | 10,11,12,13 | 4,5,6 | 2019/5/28-2019/5/30 |
| 3 | Survey 3 | 1 | 1,2,3 | 1,2,3 | 2019/5/28-2019/5/30 |

701

AGGREGATION SYSTEM AND CONTROL METHOD OF THE SAME

BACKGROUND OF THE INVENTION

Field of the Invention

The present invention relates to a technique of aggregating survey data of crops in a farm field.

Description of the Related Art

Recently, a system that aggregates a large number of survey data and provides a user with the aggregation results has been proposed in the field of agriculture so that the user can make future plans of farm work and sales based on survey data obtained in a farm field.

For example, Japanese Patent Laid-Open No. 2006-42721 has proposed a system in which a detecting device is installed in a farm field, data detected by the detecting device is transmitted to a server, and the results of aggregation and analysis performed by the server are acquired from a PC and displayed.

Unfortunately, when a human surveys a farm field and inputs the survey data from a portable terminal or the like, there is a possibility that input errors occur or a wrong disease name may be determined and input by mistake. If the survey data is directly aggregated in a situation like this, the aggregation result becomes incorrect information and may influence future plans of farm work and sales.

SUMMARY OF THE INVENTION

The present invention has been made in consideration of the above problem, and has as its object to provide a technique capable of easily checking and correcting survey data and aggregating the checked survey data.

According to an aspect of the invention, there is provided an aggregation system that aggregates survey results of crops in a farm field, and comprises a server apparatus configured to hold the survey results of crops, and a management apparatus configured to check and correct the survey results held in the server apparatus, wherein the management apparatus includes: an acquiring unit configured to acquire, from the server apparatus, survey data indicating results of a survey of crops performed in the farm field in a set period, and containing information of at least a date of the survey and survey contents; an editing unit configured to edit the information of the survey data acquired by the acquiring unit; and a first transmitting unit configured to transmit the survey data edited by the editing unit to the server apparatus, and the server apparatus includes: a management unit configured to manage survey data; a second transmitting unit configured to transmit survey data to the management apparatus; an updating unit configured to, when edited survey data is received from the management apparatus, update survey data managed by the management unit by the edited survey data; and an aggregation unit configured to aggregate survey data containing the survey data updated by the updating unit, and indicating results of a survey of crops performed in the farm field in the set period.

According to the present invention, it is possible to easily check, correct, and aggregate survey data.

Further features of the present invention will become apparent from the following description of exemplary embodiments (with reference to the attached drawings).

BRIEF DESCRIPTION OF THE DRAWINGS

FIG. 3 is a view showing examples of the functional arrangements of apparatuses of the aggregation system;

FIG. 4A is a view showing a work type table according to an embodiment;

FIG. 4B is a view showing a tag information table according to the embodiment;

FIG. 5 is a view showing an example of a farm field block information table;

FIG. 6 is a view showing an example of a survey data information table;

FIG. 7 is a view showing an example of a work data information table;

DESCRIPTION OF THE EMBODIMENTS

Figure 1:
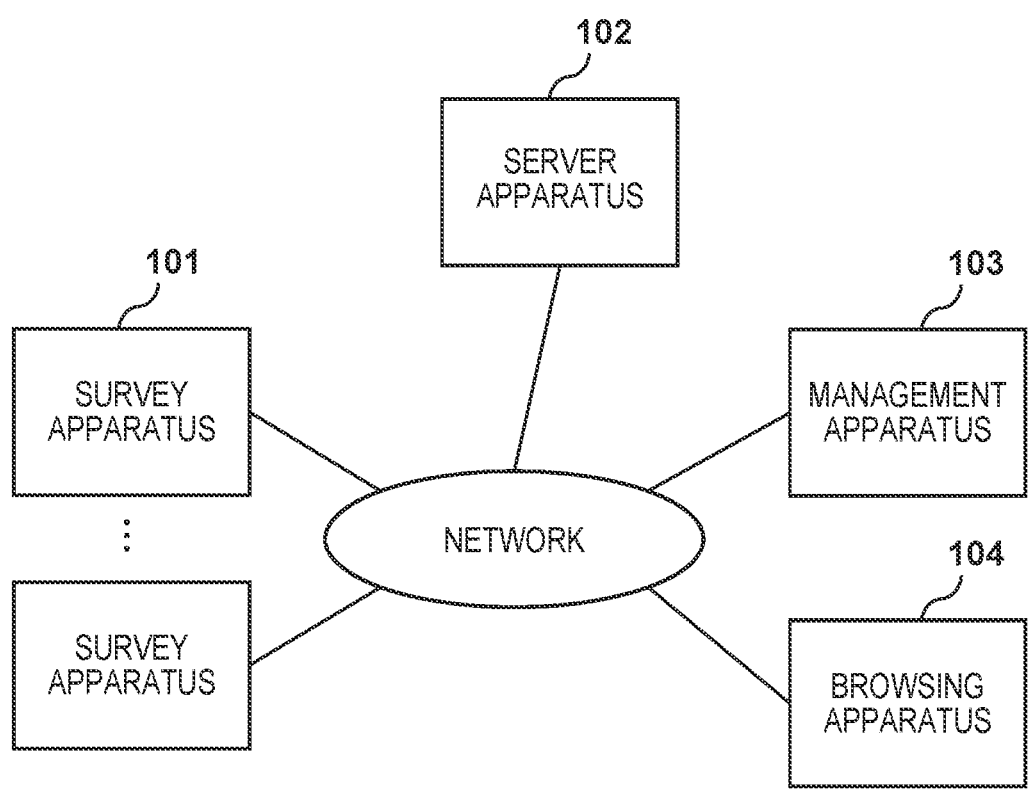
FIG. 1 is a view showing an example of the system configuration of an aggregation system.

Hereinafter, embodiments will be described in detail with reference to the attached drawings, Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An aggregation system according to the first embodiment in which, in a farm field (in this embodiment, a vineyard) for growing crops, manually obtained survey data is aggregated and the aggregation result can be browsed will be explained below.

FIG. 1 is a view showing the system configuration of the aggregation system according to this embodiment. A survey apparatus 101 is used to input information of the state of a farm field (the survey apparatus 101 is desirably a portable device having an image capturing function). More specifically, the user inputs the result of a survey on the presence/absence of a disease in the farm field and the result of counting buds and/or bunches by operating the survey apparatus 101. The survey apparatus 101 transmits the input data as survey data to a server apparatus 102.

A management apparatus 103 forms work data for binding a plurality of survey data into one work. In addition, the management apparatus 103 acquires the plurality of survey data corresponding to the work data from the server apparatus 102, displays the survey data, and corrects and confirms the contents of the survey data in accordance with user's operations. After the correction and confirmation, the management apparatus 103 transmits the work data and the survey data to the server apparatus 102.

The server apparatus 102 manages various kinds of data such as the survey data and the work data to be used in the aggregation system. Also, the server apparatus 102 aggregates the survey data based on the work data and forms aggregation data.

A browsing apparatus 104 acquires the aggregation data from the server apparatus 102 and displays the data. Note that the browsing apparatus 104 is not always necessary and may also be the same apparatus as the management apparatus 103 or the server apparatus 102.

Note that in the above configuration, communication between the individual apparatuses can be any communication form such as wired or wireless communication. Note also that the number of the survey apparatus 101 and that of the browsing apparatus 104 are not particularly limited.

Figure 2A:
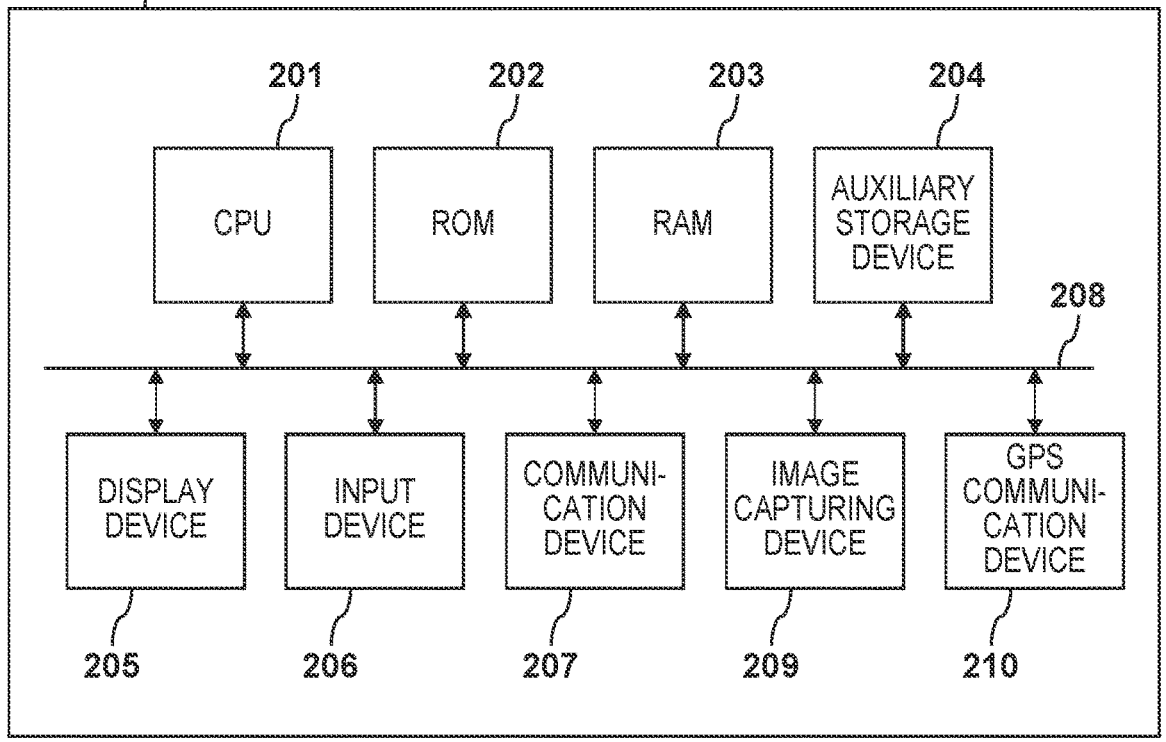
FIG. 2A is a view showing the hardware configuration of a survey apparatus in the aggregation system.

FIG. 2A is a view showing the hardware configuration of the survey apparatus 101 according to this embodiment. As shown in FIG. 2A, the survey apparatus 101 includes a CPU 201, a ROM 202, a RAM 203, an auxiliary storage device 204, a display device 205, an input device 206, a communication device 207, and a system bus 208. The survey apparatus 101 further includes an image capturing device 209 and a GPS communication device 210. These devices are connected by the system bus 208.

The CPU 201 is a central processing unit, performs arithmetic operations, logic determination, and the like for various kinds of processing, and controls the individual constituent elements connected to the system bus 208. The ROM (Read-Only Memory) 202 is a program memory and stores programs including various kinds of procedures (to be described later) for control by the CPU 201. The RAM (Random Access Memory) 203 is used as a temporary storage area such as a main memory of the CPU 201 or a work area. The CPU 201 implements processing corresponding to each flowchart (to be described later) by reading out a program stored in the ROM 202 and executing the program. It is also possible to implement a program memory by loading a program stored in the ROM 202 into the RAM 202. The CPU 201 writes the execution result of each processing in the RAM 202.

The auxiliary storage device 204 is a storage device that stores electronic data and programs according to this embodiment and keeps storing data even when turned off. The auxiliary storage device 204 can be implemented by, for example, a medium (recording medium) and an external storage drive for accessing the medium. Examples of the medium are a flash memory, a USB memory, an SSD (Solid State Drive) memory, an HDD (Hard Disk Drive), a flexible disk (FD), a CD-ROM, a DVD, and an MO. The auxiliary storage device 204 may also be a server apparatus or the like connected across a network. The auxiliary storage device 204 is, for example, an SSD (Solid State Drive) memory incorporated into the main body and not detachable from the CPU 201. This embodiment will be explained by taking, as an example, a case in which the auxiliary storage device 204 is an SSD (Solid State Driver) memory incorporated into the main body. A program memory can also be implemented by loading a program stored in the auxiliary storage device 204 into the RAM 202. The CPU 201 saves the execution result of each processing in the auxiliary storage device 204.

The display device 205 is, for example, a liquid crystal display or an organic EL display, and outputs images, characters, and figures on the display screen in accordance with processing by the CPU 201. Note that the display device 205 may also be an external device connected to the survey apparatus 101 by wired or wireless connection.

The input device 206 is, for example, a touch panel, a button, or a mouse, and accepts various operations performed by the user. The input device 206 may also be, for example, a pressure touch panel that is adhered on the display device 205 and feels user's operations, an electrostatic touch panel, or a light pen. Note that the input device 206 may also be an external device such as a mouse connected to the survey apparatus 101 by wired or wireless connection.

The communication device 207 performs bidirectional wired or wireless communication with, for example, another information processing apparatus, a communication apparatus, or an external storage device, by using a well-known communication technique.

The image capturing device 209 is a device that converts external light into electronic image data or electronic video data by using a well-known optical technique. The CPU 201 converts an external scenery obtained from the image capturing device 209 into photographic data or moving image data.

The GPS communication device 210 receives radio waves from GPS stationary satellites around the earth and calculates the longitude and latitude of the current position of the survey apparatus 101 by using a well-known supplementary positioning technique.

Figure 2B:
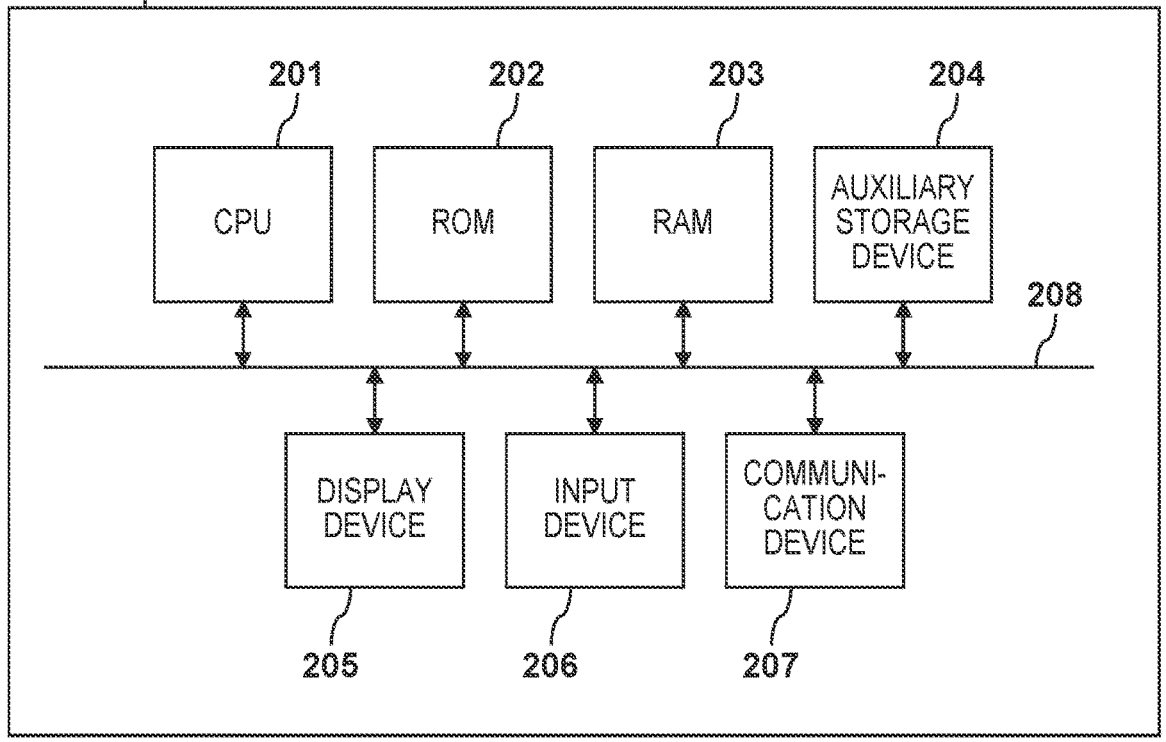
FIG. 2B is a view showing the hardware configuration of a server apparatus in the aggregation system.

FIG. 2B is a view showing the hardware configuration of the server apparatus 102 according to this embodiment. Reference numerals 201 to 208 shown in FIG. 2B are the same as those of the survey apparatus 101, so an explanation thereof will be omitted. Also, each of the management apparatus 103 and the browsing apparatus 104 practically has the same hardware configuration as that shown in FIG. 2B, so an explanation thereof will be omitted.

FIG. 3 is an example of a block diagram showing the functional arrangements of the apparatuses 101 to 104 of the aggregation system according to this embodiment. These functional units are implemented by the CPU 201 of each apparatus by loading programs stored in the ROM 202 into the RAM 203, and executing processing corresponding to each flowchart (to be described later). The execution result of each processing is held in the RAM 203 of each apparatus. When configuring hardware in place of the software processing using the CPU 201, it is only necessary to configure an arithmetic unit or a circuit corresponding to the processing of each functional unit to be explained below.

The survey apparatus 101 includes a survey data generating unit 301 and a survey data transmitting unit 302. The survey data generating unit 301 generates survey data based on image data captured by the image capturing device 209, a tag and a tag value of an image input by the input device 206, and position information acquired by the GPS communication device 210. The survey data transmitting unit 302 transmits the generated survey data to the server apparatus 102.

The server apparatus 102 includes a data managing unit 303 and an aggregation data generating unit 304. The data managing unit 303 manages data such as survey data and work data received from each apparatus by saving the data in the auxiliary storage device 204. The aggregation data generating unit 304 aggregates survey data by a flowchart (to be described later) based on work data, and generates the aggregation result as aggregation data.

The management apparatus 103 includes a work data generating unit 305, a work data transmitting unit 306, a survey data acquiring unit 307, a survey data displaying unit 308, and a survey data editing unit 309. The work data generating unit 305 generates work data for binding a plurality of survey data into one work. This work data contains information such as a period and a block input by the input device 206. The work data transmitting unit 306 transmits the generated work data to the server apparatus 102. The survey data acquiring unit 307 transmits the information of the period and block of the work data to the server apparatus 102, and acquires survey data obtained by a survey in a position of the corresponding period and the corresponding block. The survey data displaying unit 308 displays the acquired survey data on the display device 205. The survey data editing unit 309 edits the information of the survey data in accordance with an operation accepted by the input device 206.

The browsing apparatus 104 includes an aggregation data acquiring unit 310 and an aggregation data displaying unit 311. The aggregation data acquiring unit 310 acquires aggregation data from the server apparatus 102, and the aggregation data displaying unit 311 displays the aggregation data on the display device 205.

FIG. 4A shows a work type information table (to be referred to as a work type table hereinafter) 401. The work type table 401 contains a work type ID and a work type name. The work type name is a name representing the type of survey work.

FIG. 4B shows a table 402 (to be referred to as a tag table hereinafter) of information of a tag input by the survey data generating unit 301. The tag table 402 contains a tag ID, a work type ID, and a tag. The work type ID is the ID of a work type to which the tag belongs. The tag ID is a tag name tagged to the image. The tag is information indicating the contents of a survey. The survey data shows a survey result such as downy mildew or powdery mildew as, for example, a survey on pests. Also, the survey data shows a survey result such as a blooming count survey or a bunch count survey as, for example, a crop yield prediction survey. Furthermore, the survey data shows a survey result such as a sugar content survey or a hydrogen ion index survey as, for example, a crop maturity survey.

FIG. 5 shows a farm field block information table (to be referred to as a block table hereinafter) 501. The block table 501 contains a block ID, a block name, and an area. The block name is the name of each block of a farm field, and the area is position information representing the area of the block.

As the information of the tables shown in FIGS. 4A to 5, the apparatuses hold the same information in advance. However, it is also possible to adopt an arrangement in which the server apparatus 102 manages these pieces of information, and each apparatus acquires the information from the server 102 at a given timing, for example, when the apparatus is activated.

FIG. 6 shows an example of a survey data information table (to be referred to as a survey data table hereinafter) 601 to be managed by the server apparatus 102. The survey data table 601 contains a survey ID, a survey day, a position, a block ID, a tag ID, a tag value, and an image ID. The survey day is a day on which the survey was performed, the position is a position where the survey was performed, and the block ID is the ID of a block where the survey was performed. The image ID is the ID of an image obtained by capturing a survey object such as a bunch (in this embodiment, grapes), and the tag ID is the ID of a tag indicating the survey result of the object. The tag value is a value attached to the tag, for example, a value indicating the severity if the tag is related to pests, or a value indicating the number of objects such as the number of bunches if the tag is related to the yield.

FIG. 7 shows an example of a work data information table (to be referred to as a work data table hereinafter) 701 to be managed by the server apparatus 102. The work data table 701 contains a work ID, a work name, a work type ID, a tag ID, a block ID, and a period. The work name is the name of work, and the work type ID is the ID of a work type indicating the type of work. The tag ID is the ID of a tag of the target survey data, and the block ID is the ID of a block of the target survey data. The period is the period of the target survey.

Next, the operation of the aggregation system of this embodiment will be explained in accordance with practical procedures.

Figure 8:
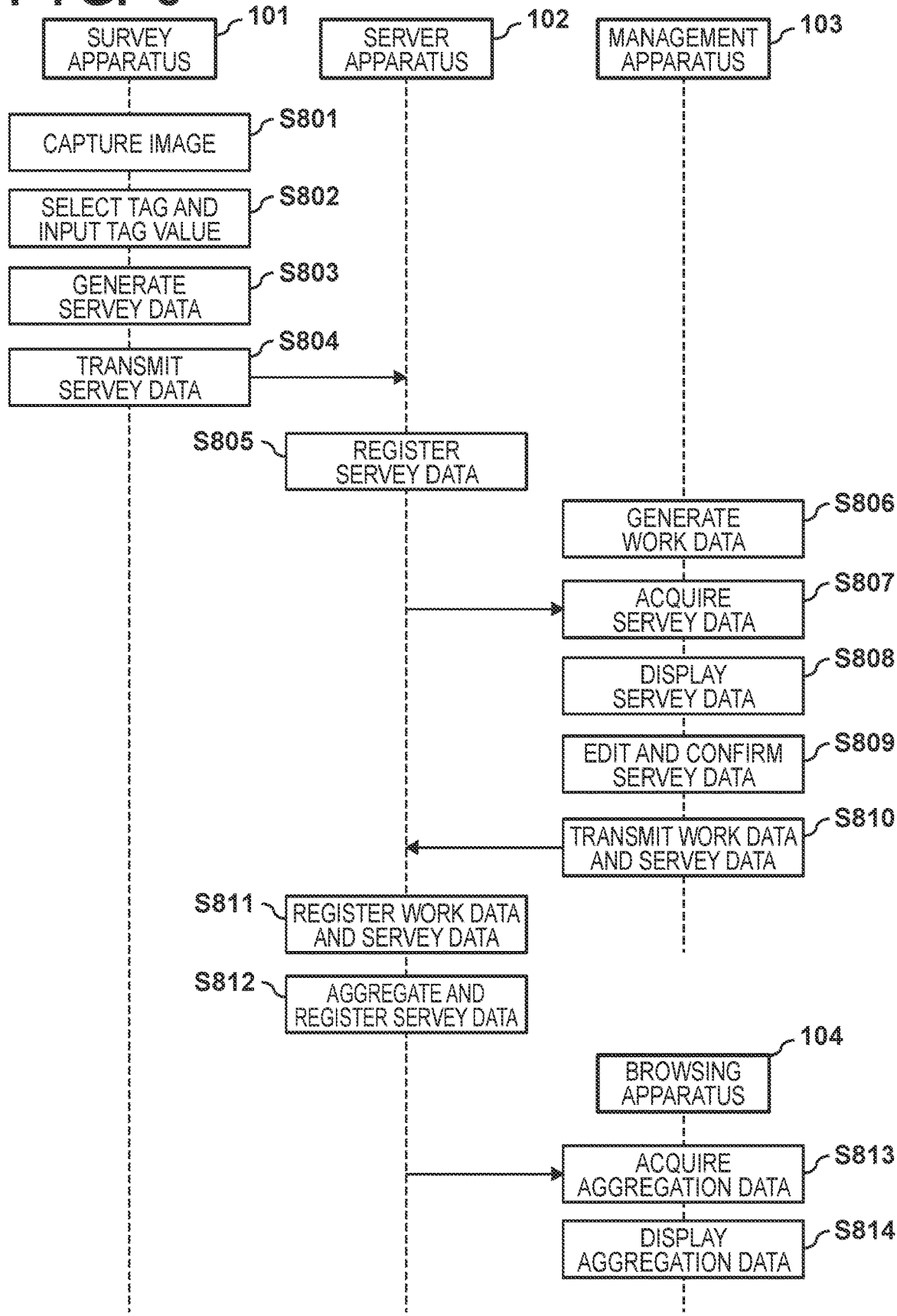
FIG. 8 is a flowchart showing an example of an operation of aggregating survey data.

FIG. 8 is a flowchart for aggregating survey data by cooperation of the survey apparatus 101, the server apparatus 102, the management apparatus 103, and the browsing apparatus 104. Each step of the flowchart will be explained below by attaching S to the head of the reference numeral of the step.

In step S801, the worker captures an image of a survey object found when surveying a farm field by using the survey apparatus 101. In step S802, the survey apparatus 101 displays tags registered in the tag table 402 and accepts the selection of a tag and the input of a value corresponding to the tag, in accordance with user's instructions from the input device 206.

Figure 9:
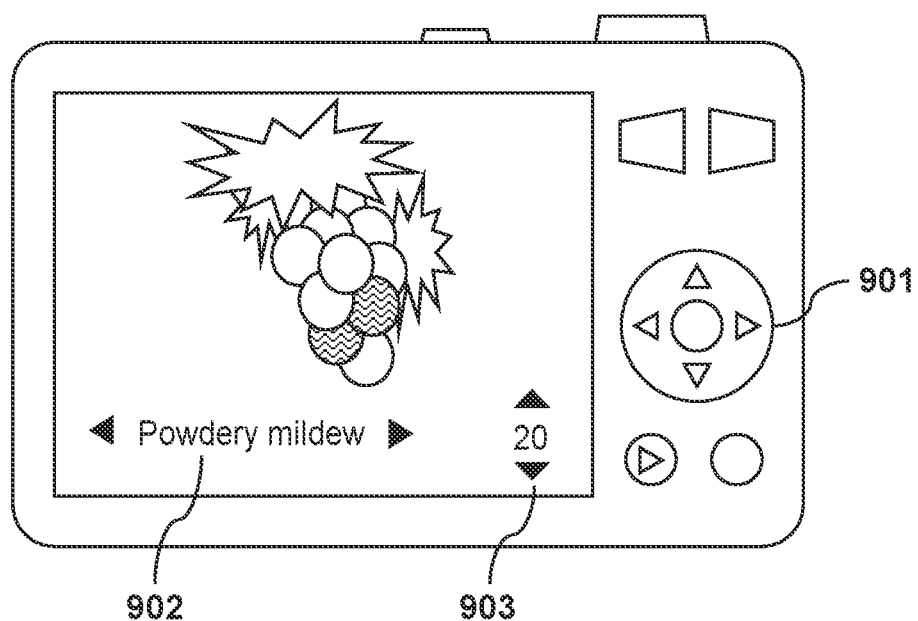
FIG. 9 is a view showing an example of an operation of capturing an image and accepting inputting of a tag and a tag value.

FIG. 9 is a view showing the way the survey apparatus 101 captures an image and accepts the input. In FIG. 9, reference numeral 901 denotes a cross button and an OK button of the input device 206, reference numeral 902 denotes a tag, and reference numeral 903 denotes a tag value. The worker searches for a target tag by using the left and right keys of the cross button, increases or decreases the tag value by using the up and down keys, and determines the input by pressing the OK button. Consequently, the process advances to step S803. For example, if the worker finds grapes affected by powdery mildew, he or she captures an image of the grapes by using the survey apparatus 101. Then, the worker selects "Powdery mildew" as a tag, and inputs "20" as a tag value if he or she determines that 20% of a bunch suffer from the disease. As described above, survey data indicates the survey result including the contents of a survey (the attribute of a survey) and its value (the attribute value of the survey).

In step S803, the survey apparatus 101 generates survey data based on the captured image and the input tag and tag value. In step S804, the survey apparatus 101 transmits the generated survey data to the server apparatus 102. The generated survey data contains not only information of the image and the tag, but also survey day information obtained from the time of image capturing and position information obtained from the GPS communication device when the image was captured. The block ID can be set by the survey apparatus 101 based on the position information and the block table 501, and can also be set when the server apparatus 102 has received the survey data.

In step S805, the server apparatus 102 registers the survey data received from the survey apparatus 101 in the survey data table 601. Note that steps S801 to S804 are executed whenever the survey apparatus 101 accepts an input from the user who surveys the farm field, and, whenever survey data is received, the server apparatus 102 registers the survey data in the survey data table 601 in step S805.

In step S806, the management apparatus 103 generates work data for binding the survey data into one work, in accordance with an instruction from the work manager. Assume that information of the work data is obtained when the management apparatus 103 accepts an operation from the input device 206. In step S807, the management apparatus 103 transmits request information containing information of the work data period, the block ID, and the tag ID, and acquires the corresponding survey data from the server apparatus 102. The server apparatus 102 returns, to the management apparatus 103, only survey data in the survey data table 601, which matches the period, the block, and the tag received from the management apparatus 103. In step S808, the management apparatus 103 displays the received survey data. In step S809, the management apparatus 103 accepts an operation of the input device 206 from the work manager, and edits the survey data. When an operation of confirming that the survey data has no problem is accepted from the manager, the management apparatus 103 transmits the work data and the edited survey data to the server apparatus 102 in step S810.

Figure 10A:
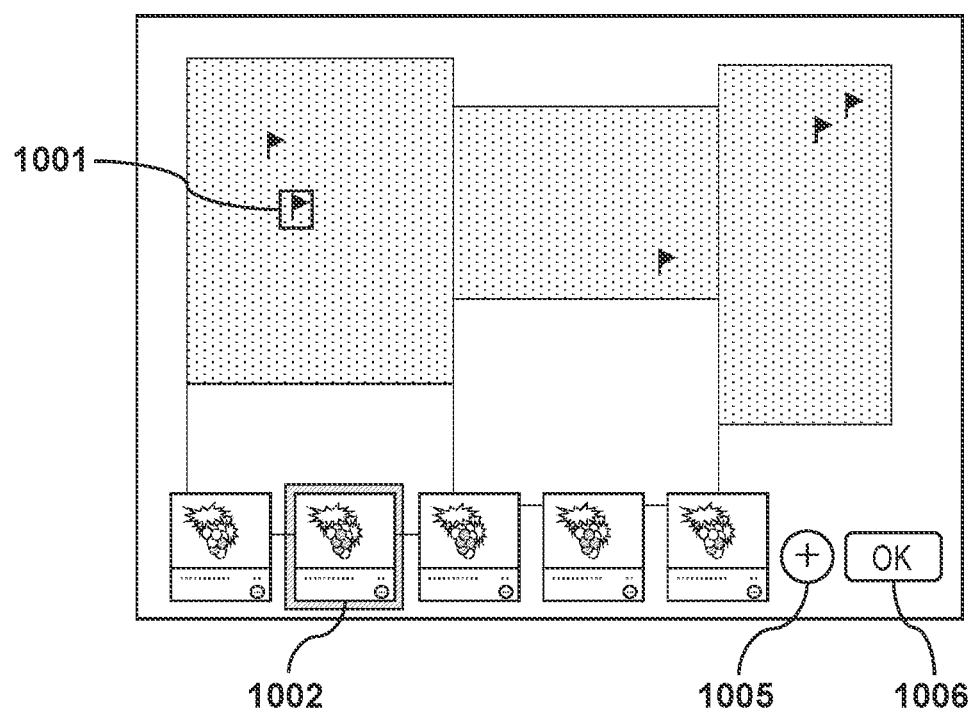
FIG. 10A is a view showing a survey data display example.
Figure 10B:
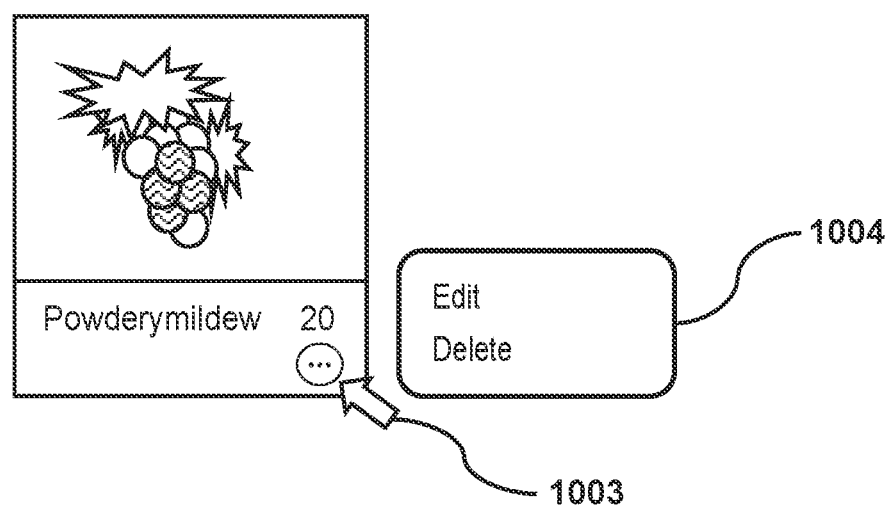
FIG. 10B is a view showing a display example in which a user inputs an instruction to edit one survey data.

FIG. 10A is a view showing the way the user displays survey data on the management apparatus 103, corrects survey data for which a wrong tag value is input, and confirms that there is no problem. A flag icon 1001 indicates a position (image capturing position) on a map representing a farm field in which selected survey data 1002 was obtained. The display screen of the management apparatus 103 displays flag icons the number of which is equal to the number of received survey data, and displays captured images contained in the survey data corresponding to the flag icons. FIG. 10B is a view showing the way the user edits the selected survey data 1002. When the flag icon 1001 is selected, the corresponding survey data 1002 is highlighted, so the user can visually confirm the correspondence between them. Note that when survey data is selected, the corresponding flag icon is highlighted. When the manager presses a menu button 1003 in the lower right corner of the survey data 1001, a menu 1004 is displayed, so the manager can edit or delete the information (the tag and the tag value) of the survey data. When the manager gives an instruction to perform editing (when the user clicks "Edit" in FIG. 10B), he or she can edit the corresponding survey data. Examples of objects to be edited are the date (image capturing time), the position, and the block name of the survey data, the result of a survey on the presence/absence of a disease in the farm field, and the result of counting buds and/or bunches. Note that when changing the position, numerical values indicating the coordinates can be changed. However, the position or the block of survey data can be changed by dragging the flag icon 1001 indicating the position. Furthermore, when the manager presses a button 1005, it is possible to display a screen for inputting information of survey data, and add survey data later. When the manager presses a button 1006, he or she can advance to the processing in step S810 described above by assuming that it is confirmed that the survey data has no problem.

In step S811, the server apparatus 102 registers the work data received from the management apparatus 103 in the work data table 701, and registers (updates) the edited (confirmed) survey data in the survey data table 601. In step S812, the server apparatus 102 acquires survey data matching the period, the block, and the tag of the received work data, and performs an aggregation process. For example, when the tag is related to pests, the server apparatus 102 calculates the degree of damage on each block from information of the number of survey data and the tag value (severity). When the tag is related to the yield, the server apparatus 102 calculates the yield of each block from information of the tag value (the number of objects) of the survey data. When the tag is related to the maturity, the server apparatus 102 calculates the average value of the maturities of each block from the tag value (maturity) of the survey data. The server apparatus 102 manages data of the aggregation result as aggregation data by saving the data in the auxiliary storage device 204.

In step S813, the browsing apparatus 104 acquires the aggregation data (containing the updated survey data) from the server apparatus 102. In step S814, the browsing apparatus 104 displays the acquired aggregation data. When there are a plurality of aggregation data, the browsing apparatus 104 displays a list of the aggregation data, and displays aggregation data selected by the input device 206.

According to this embodiment explained above, the server apparatus 102 manages survey data transmitted from the survey apparatus 101, and the management apparatus 103 acquires and displays only survey data corresponding to work data. Therefore, the manager can easily confirm that the survey data has no problem. If there is a problem, the manager can easily correct the problem by editing information of the survey data. In addition, the management apparatus 103 transmits work data after it is confirmed that there is no problem. Accordingly, the server apparatus 102 can always aggregate survey data without any problem, and the manager can browse correct aggregation results on the browsing apparatus 104.

Note that survey data can also have another information, and the manager can also display and edit the information on the management apparatus 103 in this case. For example, the information of survey data can also contain information of the direction of the survey apparatus 101 when image capturing was performed, and the management apparatus 103 can also display information such as an icon indicating the direction so that the direction can be edited.

In addition, to allow the manager using the management apparatus 103 to easily find survey data having a problem, the management apparatus 103 can also estimate a tag or a tag value of an image from image data by using a learned model having undergone machine learning, and highlight information different from the contents of survey data. For example, a plurality of image data as input data and a plurality of combinations of tags and tag values as output data are prepared as learning data. A learned model that obtains pieces of knowledge from these learning data by machine learning and outputs data as a result with respect to input data based on the pieces of obtained knowledge is generated. This learned model can be configured as, for example, a neural network model. Then, as a program for performing processing equivalent to that of the abovementioned processing unit, the learned model operates in cooperation with a CPU or a GPU, thereby performing the processing of the processing unit. Note that the learned model described above may also be updated as needed after predetermined processing.

Modification 1

In the above first embodiment, the management apparatus 103 transmits information of the period, the block, and the tag of work data, and acquires only survey data matching all of these pieces of information from the server apparatus 102.

In modification 1, a method of acquiring survey data not matching information of work data and correcting the survey data later so that the data matches the information of the work data in order to extend the range of correctable survey data will be explained. An explanation of the contents already explained in the first embodiment will be omitted as needed.

Referring to FIG. 8, when acquiring survey data from the server apparatus 102 in step S807, the management apparatus 103 acquires not only survey data matching the period, the block, and the tag of work data, but also survey data found to be close. "Close" herein mentioned indicates allowable ranges of the time (period) and the geographical position with respect to the work data. More specifically, when information is the period, it is determined that survey data obtained in a predetermined period having a slightly wider range including days before and after the day of interest is found to be close and is acquired. When information is the block (geographical distance), the distance to the position of survey data is calculated based on information of the area in the block table 501, and survey data within a predetermined distance is found to be close and is acquired. When information is the tag, survey data having a tag matching the work type is found to be close and is acquired. In modification 1 as described above, the management apparatus 103 can acquire and display survey data within the allowable ranges with respect to the time and the geographical position indicated by set work data. The management apparatus 103 can also acquire survey data having a work type close to a work type set by work data.

Figure 11:
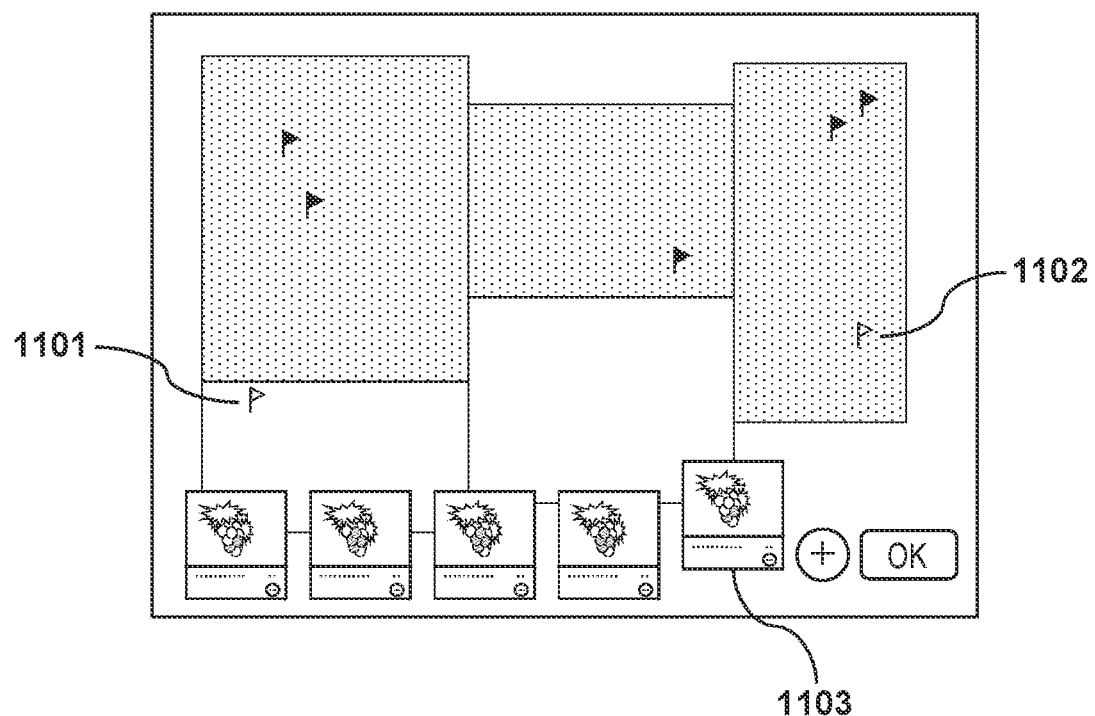
FIG. 11 is a view showing an example of an operation of displaying survey data similar to work data information, correcting the displayed survey data, and confirming that there is no problem.

When displaying survey data in step S808, survey data matching information of work data and survey data found to be close are displayed so that they can be discriminated from each other. FIG. 11 is a view showing the way a flag icon of survey data matching information of work data and a flag icon of survey data found to be close are displayed as they are discriminated from each other. Reference numeral 1101 displays the position of survey data not matching the block by a white flag, and reference numeral 1102 displays the position of survey data not matching the survey date or the tag by a white flag, so that they can be discriminated from other flags. Reference numeral 1103 displays information of survey data found to be close by slightly shifting the information upward so that it can be discriminated from others. Note that survey data can also be displayed in a form capable of discriminating which of the time and the geographical distance is close. When survey data is edited to have contents matching information of work data in step S809, the flag is blackened, and the display of the survey data is shifted down and returned to the original position.

According to modification 1 of the first embodiment explained above, survey data matching information of work data and survey data close to the information of the work data are acquired. Therefore, survey data can be corrected later so as to match the information of the work data. For example, if position information acquired from the GPS communication device 210 is shifted, if date setting is shifted, or if tag inputting is wrong, although a survey was performed within a block, data can be corrected to have correct contents.

Note that in modification 1, survey data found to have a close, period, block, or a close tag is acquired. To prevent display contents from becoming too many, however, it is also possible to combine the conditions of "match" and "close", for example, the periods match but the blocks or the tags are close.

Second Embodiment

In the first embodiment and modification 1 thereof described above, the survey apparatus 101 displays all tags registered in the tag table 402, and generates survey data based on a selected tag. In this second embodiment, however, a management apparatus 103 generates work data in advance, and a survey apparatus 101 narrows down tags to be displayed based on work types registered in the work data, thereby reducing the possibility that a wrong tag is selected during a survey. The differences from the first embodiment will be explained below.

Figure 12:
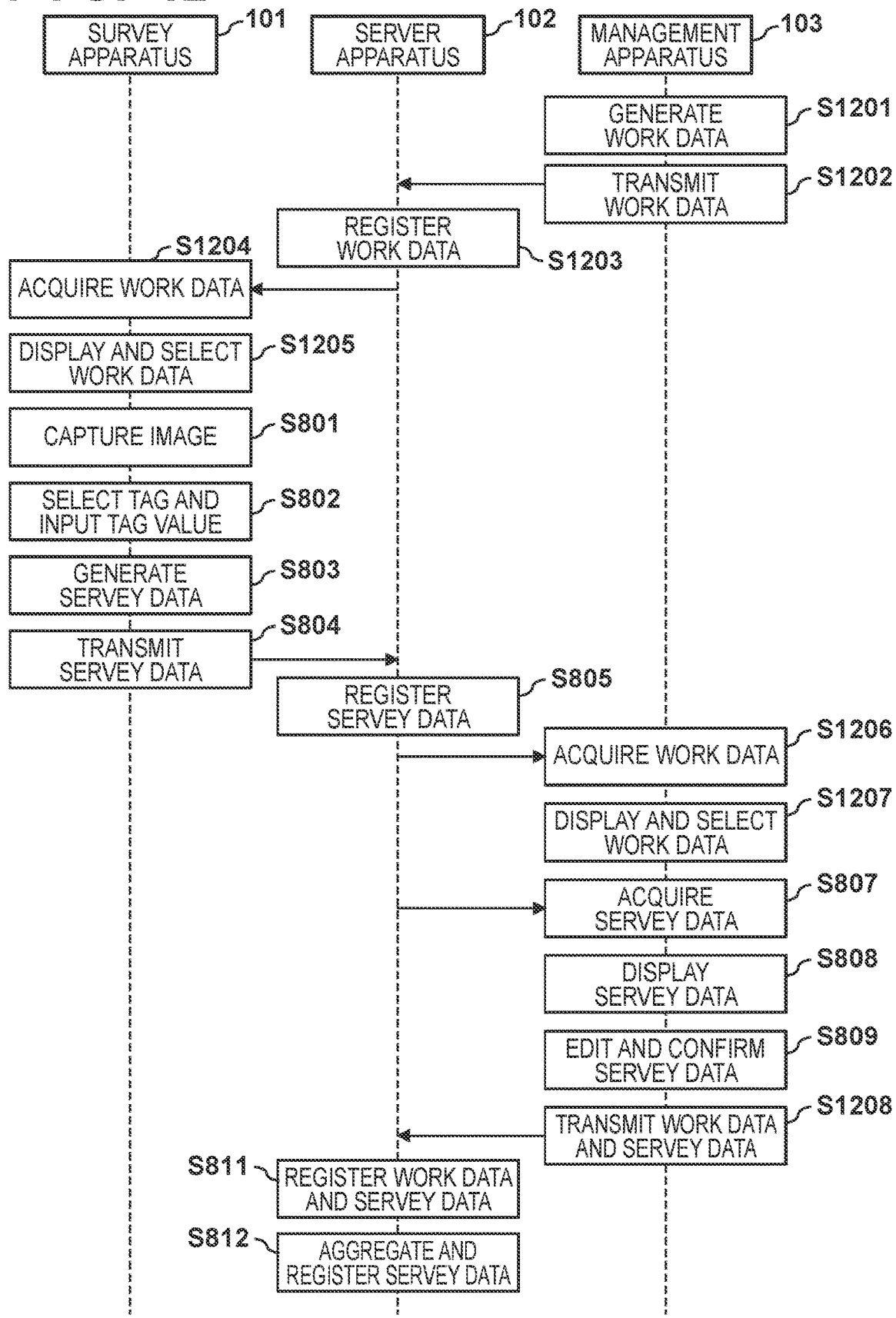
FIG. 12 is a flowchart showing an example of an operation of generating and aggregating survey data by using work data information.

In a flowchart shown in FIG. 12, the timing at which work data is generated in the flowchart shown in FIG. 8 is shifted to the timing before survey data is generated, thereby generating survey data by using information of the work data.

In step S1201, the management apparatus 103 generates work data in the same manner as in step S806 of the first embodiment. In step S1202, the management apparatus 103 transmits information of the generated work data to a server apparatus 102.

In step S1203, the server apparatus 102 registers the work data received from the management apparatus 103 in a work data table 701. Steps S1201 to S1203 are executed whenever the management apparatus 103 accepts an input from the manager, and, whenever work data is received, the server apparatus 102 registers the work data in the work data table 701.

In step S1204, the survey apparatus 101 acquires the work data registered in the work data table 701 from the server apparatus 102. Note that the server apparatus 102 may also transmit, to the survey apparatus 101, only work data having period information containing the current date. In step S1205, the survey apparatus 101 displays a list of the acquired work data, and selects work data by accepting an operation from an input device 206. Steps S801 to S804 are steps of generating survey data by the survey apparatus 101 in the same manner as in the first embodiment. When displaying tags in step S802, however, the survey apparatus 101 displays only tags for which a work type ID in a tag table 402 matches the work type ID of the work data selected in step S1205.

In step S805, the server apparatus 102 registers the survey data transmitted from the survey apparatus 101 in step S804 in a survey data table 601.

In step S1206, the management apparatus 103 acquires the work data registered in the work data table 701 from the server apparatus 102. In step S1207, the management apparatus 103 displays a list of the acquired work data, and selects work data by accepting an operation from the input device 206. In steps S807 to S809, the management apparatus 103 acquires survey data based on information of the selected work data in the same manner as in the first embodiment, edits the survey data as needed, and confirms that the survey data has no problem. In step S1208, the management apparatus 103 transmits, to the server apparatus 102, information of the work data and the edited survey data, and information indicating the execution of aggregation.

In steps S811 and S812, the server apparatus 102 performs a survey data aggregation process and saves the aggregation data in the same manner as in the first embodiment. After that, the process advances to a browsing step to be performed by a browsing apparatus 104. However, this step is the same as that of the first embodiment, so an explanation thereof will be omitted.

According to the second embodiment explained above, work data is generated in advance, and tags to be displayed are narrowed down based on work data selected during a survey, thereby preventing a tag irrelevant to the work from being displayed. This can reduce the possibility that a wrong tag is selected during a survey.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-185459, filed Oct. 8, 2019, which is hereby incorporated by reference herein in its entirety.

What is claimed is:

1. An aggregation system that aggregates survey results of crops in a farm field, and comprises a server apparatus configured to hold the survey results of crops, and a management apparatus configured to check and correct the survey results held in the server apparatus, wherein
the management apparatus includes:
an acquiring unit configured to acquire, from the server apparatus, survey data indicating results of a survey of crops performed in the farm field in a set period, and
containing information of at least a date of the survey and survey contents;
an editing unit configured to edit the information of the survey data acquired by the acquiring unit; and
a first transmitting unit configured to transmit the survey data edited by the editing unit to the server apparatus, and
the server apparatus includes:
a management unit configured to manage the survey data;
a second transmitting unit configured to transmit the survey data to the management apparatus;
an updating unit configured to, when edited survey data is received from the management apparatus, update the survey data managed by the management unit by the edited survey data; and
an aggregation unit configured to aggregate survey data containing the survey data updated by the updating unit, and indicating results of the survey of crops performed in the farm field in the set period.

2. The system according to claim 1, further comprising a survey apparatus configured to generate survey data,
wherein the survey apparatus includes:
a first generating unit configured to generate survey data; and
a third transmitting unit configured to transmit the survey data generated by the first generating unit to the server apparatus.

3. The system according to claim 2, wherein
the survey apparatus further includes an image capturing unit configured to perform image capturing, and
the first generating unit generates survey data containing an image of a crop captured by the image capturing unit, and position information of the crop.

4. The system according to claim 3, wherein the survey apparatus includes a detecting unit configured to detect a geographical position of the survey apparatus, and
the first generating unit generates survey data containing, as the position information of the crop, position information detected by the detecting unit when image capturing was performed by the image capturing unit.

5. The system according to claim 3, wherein the management apparatus includes a display control unit configured to display a predetermined icon indicating an image capturing position on a map indicating the farm field, and an image captured in the image capturing position, by associating the predetermined icon and the image with each other.

6. The system according to claim 1, wherein
the management apparatus further includes a display control unit configured to control display,
the acquiring unit of the management apparatus acquires survey data containing at least information of a period and matching a condition indicated by work data for designating the set period, and survey data falling within a predetermined allowable range from the condition indicated by the work data, and
the display control unit of the management apparatus displays the survey data matching the condition indicated by the work data, and the survey data falling within the predetermined allowable range from the condition indicated by the work data, by discriminating between the former and the latter.

7. The system according to claim 3, wherein the editing unit of the management apparatus edits the date and the position information of the survey data.

8. The system according to claim 1, wherein
the survey data contains information of a work type, and
the acquiring unit of the management apparatus acquires survey data related to a set work type.

9. The system according to claim 8, wherein the acquiring unit of the management apparatus acquires survey data containing at least information of a period and matching the set period and a condition indicated by work data for designating the work type, and survey data found to be close to information of the work data based on work type information of the survey data and work type information of the work data.

10. The system according to claim 2, wherein
the survey apparatus further includes a second acquiring unit configured to acquire, from the server apparatus, work data generated by the survey apparatus and indicating a work type, and
the first generating unit of the survey apparatus generates the survey data based on information of the acquired work data.

11. The system according to claim 10, wherein the first generating unit of the survey apparatus makes only information of survey contents related to the acquired work data selectable, and generates survey data indicating information of survey contents selected by a worker.

12. The system according to claim 1, further comprising a browsing apparatus configured to browse survey data updated by the updating unit of the server apparatus.

13. The system according to claim 1, wherein when an operation of confirming that information of survey data acquired from the acquiring unit has no problem is accepted from a user, the first transmitting unit of the management apparatus transmits the survey data to the server apparatus.

14. The system according to claim 1, wherein the editing unit of the management apparatus edits or deletes, based on an operation performed by a user, an attribute of a survey, an attribute value of the survey, a date, position information, a block name, presence/absence of a disease in the farm field, or a result of counting buds or bunches, indicated by survey data selected by the user from the survey data acquired by the acquiring unit.

15. The system according to claim 1, wherein when editing position information indicated by survey data acquired by the acquiring unit, the editing unit of the management apparatus changes position information indicated by the survey data to numerical values indicating coordinates, or changes the position information indicated by the survey data to a position indicated on a map by a user, based on an operation performed by the user.

16. The system according to claim 1, wherein the survey data indicates a survey date, a survey block, information of a survey position, and an image obtained by capturing a survey object.

17. The system according to claim 1, wherein the survey data indicates a pest survey result, a crop yield prediction survey result, or a crop maturity survey result.

18. The system according to claim 1, wherein the aggregation unit of the server apparatus aggregates survey data matching a condition designated by the management apparatus.

19. The system according to claim 1, wherein the aggregation unit of the server apparatus outputs degrees of damages of blocks as aggregation results when aggregating pest survey results, outputs yields of the blocks as aggregation results when aggregating yield survey results, and outputs an average value of maturities of the blocks as an aggregation result when aggregating maturity survey results.

20. A method of controlling an aggregation system that aggregates survey results of crops in a farm field, and comprises a server apparatus configured to hold the survey results of crops, and a management apparatus configured to check and correct the survey results held in the server apparatus, wherein the method comprising:
in the management apparatus:
(a) acquiring, from the server apparatus, survey data indicating results of a survey of crops performed in the farm field in a set period, and containing information of at least a date of the survey and survey contents;
(b) editing the information of the survey data acquired in the acquiring; and
(c) transmitting the survey data edited in the editing to the server apparatus, and
in the server apparatus:
(d) managing the survey data;
(e) transmitting the survey data to the management apparatus;
(f) when edited survey data is received from the management apparatus, updating the survey data managed in the managing by the edited survey data; and
(g) aggregating survey data containing the survey data updated in the updating, and
indicating the results of the survey of crops performed in the farm field in the set period.

21. A non-transitory computer-readable storage medium storing a program which, when read and executed by a computer, causes the computer to execute the steps of a method of controlling an aggregation system that aggregates survey results of crops in a farm field, and comprises a server apparatus configured to hold the survey results of crops and a management apparatus configured to check and correct the survey results held in the server apparatus, wherein the method comprising:
in the management apparatus:
(a) acquiring, from the server apparatus, survey data indicating results of a survey of crops performed in the farm field in a set period, and containing information of at least a date of the survey and survey contents;
(b) editing the information of the survey data acquired in the acquiring; and
(c) transmitting the survey data edited in the editing to the server apparatus, and
in the server apparatus:
(d) managing the survey data;
(e) transmitting the survey data to the management apparatus;
(f) when edited survey data is received from the management apparatus, updating the survey data managed in the managing by the edited survey data; and
(g) aggregating survey data containing the survey data updated in the updating, and
indicating the results of the survey of crops performed in the farm field in the set period.

22. A server apparatus in an aggregation system that aggregates survey results of crops in a farm field, and comprises the server apparatus configured to hold the survey results of crops, and a management apparatus configured to check and correct the survey results held in the server apparatus, wherein the management apparatus includes an acquiring unit configured to acquire, from the server apparatus, survey data indicating results of a survey of crops performed in the farm field in a set period, and containing information of at least a date of the survey and survey contents; an editing unit configured to edit the information of the survey data acquired by the acquiring unit; and a first transmitting unit configured to transmit the survey data edited by the editing unit to the server apparatus, the server apparatus comprising:
a management unit configured to manage the survey data;
a second transmitting unit configured to transmit the survey data to the management apparatus;
an updating unit configured to, when edited survey data is received from the management apparatus, update the survey data managed by the management unit by the edited survey data; and an aggregation unit configured to aggregate survey data containing the survey data updated by the updating unit, and indicating results of the survey of crops performed in the farm field in the set period.

23. A management apparatus in an aggregation system that aggregates survey results of crops in a farm field, and comprises a server apparatus configured to hold the survey results of crops, and the management apparatus configured to check and correct the survey results held in the server apparatus, the management apparatus comprising:
- an acquiring unit configured to acquire, from the server apparatus, survey data indicating results of a survey of crops performed in the farm field in a set period, and containing information of at least a date of the survey and survey contents;
- an editing unit configured to edit the information of the survey data acquired by the acquiring unit; and
- a first transmitting unit configured to transmit the survey data edited by the editing unit to the server apparatus,
- wherein the server apparatus includes a management unit configured to manage the survey data, a second transmitting unit configured to transmit the survey data to the management apparatus, an updating unit configured to, when edited survey data is received from the management apparatus, update the survey data managed by the management unit by the edited survey data, and an aggregation unit configured to aggregate survey data containing the survey data updated by the updating unit, and indicating results of the survey of crops performed in the farm field in the set period.

* * * * *